United States Patent [19]

Cesare

[11] Patent Number: 4,843,128
[45] Date of Patent: Jun. 27, 1989

[54] ELASTOMERIC COMPOSITION HAVING INCREASED OZONE RESISTANCE

[75] Inventor: Frank C. Cesare, Woodbury, Conn.

[73] Assignee: Uniroyal Chemical Company, Inc., Middlebury, Conn.

[21] Appl. No.: 201,131

[22] Filed: Jun. 1, 1988

Related U.S. Application Data

[63] Continuation-in-part of Ser. No. 866,854, May 23, 1986, abandoned.

[51] Int. Cl.[4] .................... C08L 23/26; C08L 23/16; C08L 9/00; C08L 7/00
[52] U.S. Cl. .................................. 525/193; 525/186; 525/211; 525/232; 525/237; 525/194; 524/87; 524/526
[58] Field of Search ............... 525/193, 194, 237, 211; 524/87

[56] References Cited

U.S. PATENT DOCUMENTS

| | | | |
|---|---|---|---|
| 3,356,764 | 12/1967 | Gentile | 525/232 |
| 3,364,155 | 1/1968 | Souffie | 260/4 |
| 3,378,512 | 4/1968 | Hamed et al. | 260/33.6 |
| 3,819,552 | 6/1974 | Glanville et al. | 260/27 BB |
| 3,819,592 | 6/1974 | Visser et al. | 260/80.78 |
| 3,884,993 | 5/1975 | Gros | 260/897 A |
| 4,481,335 | 11/1984 | Stark | 525/261 |

OTHER PUBLICATIONS

Kirk-Othmer, Encyclopedia of Chem. Tech., 3rd Ed., vol. 8, p. 499, and vol. 20, p. 407 (1980).

*Primary Examiner*—Carman J. Seccuro
*Attorney, Agent, or Firm*—John A. Shedden

[57] ABSTRACT

An elastomeric composition formed by curing a blend comprised of (A) between about 70 and about 94 phr of a highly unsaturated rubber; (B) between about 3 and about 27 phr of ethylene/propylene/nonconjugated diene terpolymer having a number average molecular weight of more than about 35,000; (C) between about 3 and about 27 phr of ethylene/propylene/nonconjugated diene terpolymer having a number average molecular weight of between about 500 and about 15,000; between about 2 and about 7.5 phr of a quinoline antioxidant; and (D) an effective amount of curative exhibit unexpectedly desirable ozone resistance. Also disclosed is a process for preparing such elastomeric compositions.

16 Claims, No Drawings

ELASTOMERIC COMPOSITION HAVING INCREASED OZONE RESISTANCE

This application is a continuation-in-part of U.S. patent application Ser. No. 866,854, filed May 23, 1986, now abandoned.

FIELD OF THE INVENTION

This invention is directed to an elastomeric composition formed by curing a blend comprised of (A) between about 70 and about 94 phr of a highly unsaturated rubber: (B) between about 3 and about 27 phr of ethylene/propylene/-nonconjugated diene terpolymer having a number average molecular weight of more than about 35,000; (C) between about 3 and about 27 phr of ethylene/propylene/nonconjugated diene terpolymer having a number average molecular weight of between about 500 and about 15,000; (D) between about 2 and about 7.5 phr of a quinoline antidegradant; and (E) an effective amount of curative. In another aspect, this invention is directed to a process for preparing such elastomeric composition. The composition of this invention exhibits unexpectedly desirable ozone resistance.

BACKGROUND OF THE INVENTION

A major problem associated with the use of highly unsaturated rubbers (such as natural rubber, polybutadiene, styrene-butadiene rubber, nitrile rubber, polyisoprene and the like) is the surface degradation, typically exemplified by cracking, caused by ozone. In order to overcome this problem of ozone attack, several approaches have been undertaken to increase the ozone resistance of such highly unsaturated rubbers.

One such approach has been to blend the highly unsaturated rubber with an ozone resistant rubber, such as high molecular weight EPDM. Thus, Kirk-Othmer, *Encyclopedia of Chemical Technology*, 3d Ed. Vol 8, pg. 499 (1980), indicates that "... an important application for EPDM is in blends with another rubber. Ozone resistance is thus provided without significant participation in co-cure, with the host rubber comprising the major portion of the blend." This use of EPDM to increase the ozone resistance of unsaturated rubbers is the subject of several publications, many directed to co-curing mechanisms, such as U.S. Pat. No. 3,706,819 (Usamoto et al), U.S. Pat. No. 3,678,135 (Mastromatteo et al) and the like.

A second approach taken in the past to improve the ozone resistance of highly unsaturated rubbers has been to add chemicals to combat the attack of ozone. Among the classes of compounds which have been employed with some success are quinolines. Thus, Kirk-Othmer, supra, Vol. 20 at page 407, states that "... styrenebutadiene rubber, polybutadiene, nitrile, polyisoprene and natural rubber are quite susceptible to ozone attack ... and 1,2-dihydro-2,2,4-trimethyl-6-ethoxyquinoline (Santoflex A. W. Monsanto) give[s] adequate ozone protection". Additional quinoline antidegradants are described in the "Index of Commercial Antioxidants & Antiozonants," Goodyear Chemicals (3d Ed., 1982).

The combination of these approaches has also been attempted in the past. Thus, U.S. Pat. No. 3,356,764 to Gentile discloses an ozone-resistant composition comprised of (1) conjugated diene polymer rubber, (2) ethylene-propylene copolymer rubber (preferably EPDM), and (3) poly(trimethyl dihydroquinolene) or 6-ethoxy-1,2-dihydro-2,2,4-trimethyl quinoline. While such combination of approaches will improve the ozone resistance of highly unsaturated rubbers to some degree (compare Comparative Experiments A and B below), it would nevertheless be desirable to further increase the ozone resistance of such rubber compositions, and/or to be able to increase the proportion of unsaturated rubber which comprise such mixture (and thereby increase the tensile properties of the composition) while maintaining good ozone resistance.

It has now been unexpectedly found that when the EPDM component of compositions similar to those described in Gentile (i.e., compositions comprised of a highly unsaturated rubber, EPDM and a quinoline antidegradant) is composed of two components—(a) a high molecular weight component, similar to the material employed in Gentile; and (b) a low molecular weight "liquid" EPDM component (a substance unknown at the time of the Gentile patent)—the ozone resistance of such composition is significantly increased at similar EPDM levels. Moreover, it has been discovered that the use of such high molecular weight and low molecular weight EPDM components will unexpectedly reduce the viscosity and therefore increase the processability of the uncured composition.

DESCRIPTION OF THE INVENTION

In one aspect this invention relates to an elastomeric composition formed by curing a blend comprised of (A) between about 70 and about 94 phr of a highly unsaturated rubber;

(B) between about 3 and about 27 phr of an ethylene/propylene/nonconjugated diene terpolymer having a number average molecular weight of more than about 35,000;

(C) between about 3 and about 27 phr of an ethylene/propylene/nonconjugated diene terpolymer having a number average molecular weight of between about 500 and about 15,000;

(D) between about 2 and about 7.5 phr of a quinoline antidegradant; and (E) an effective amount of curative.

In another aspect, this invention is directed to a process for preparing an elastomeric composition, which process comprises the steps of:

(I) forming a blend comprised of:

(A) between about 70 and about 94 phr of a highly unsaturated rubber;

(B) between about 3 and about 27 phr of an ethylene/propylene/nonconjugated diene terpolymer having a number average molecular weight of more than about 35,000;

(C) between about 3 and about 27 phr of an ethylene/propylene/nonconjugated diene terpolymer having a number average molecular weight of between about 500 and about 15,000;

(D) between about 2 and about 7.5 phr of a quinoline antidegradant; and (E) an effective amount of curative; and (II) subjecting said blend to curing conditions for a time sufficient to cure said blend.

As is employed herein, the term "phr" means parts by weight per 100 parts by weight of rubber. Thus, for example, between about 2 and about 7.5 parts by weight of quinoline antidegradant are employed per 100 parts by weight of rubber (i.e., per 100 parts of the total weight of components A plus B plus C). Moreover, as is employed herein the term "highly unsaturated rubber" means a rubber having an iodine number of about 50 or greater. The iodine number of a particular rubber compound may be determined in accordance with the method described by S. G. Gallo, H. K. Wiese and J. F. Nelson in "Unsaturation in Isoprene-Isobutylene Copolymers," Industrial and Engineering Chemistry, Vol. 40, pp 1277–80 (1948).

The compositions of this invention are comprised of (A) between about 70 and about 94, preferably between about 80 and about 92, most preferably between about 83 and about 90 phr of a highly unsaturated rubber;

(B) between about 3 and about 27, preferably between about 4 and about 20, most preferably between about 5 and about 10 phr of EPDM having a molecular weight of more than about 35,000;

(C) between about 3 and about 27, preferably between about 4 and about 20, most preferably between about 5 and about 10 phr of EPDM having a molecular weight of between about 500 and about 15,000; and (D) between about 2 and about 7.5 phr, preferably between about 2.5 and about 6 phr of a quinoline antidegradant.

Moreover, such compositions comprise an amount of curative effective to cure the rubbers contained in such composition. Typically, such curatives will be present in amounts of between about 0.5 and about 5 phr.

Representative of the highly unsaturated rubbers which may be employed in the practice of this invention are diene rubbers. Such rubbers will typically possess an iodine number of between about 100 and about 250, although highly unsaturated rubbers having a higher or a lower (i.e., of 50–100) iodine number may also be employed. Illustrative of the diene rubbers which may be utilized are polymers based on conjugated dienes such as 1,3-butadiene; 2-methyl-1,3-butadiene; 1,3-pentadiene; 2,3-dimethyl-1,3-butadiene; and the like, as well as copolymers of such conjugated dienes with monomers such as styrene, alpha-methylstyrene, acrylonitrile, methacrylonitrile, methyl acrylate, ethyl acrylate, methyl methacrylate, ethyl methacrylate, vinyl acetate and the like. Preferred highly unsaturated rubbers include natural rubber, cis-polyisoprene, polybutadiene, poly(styrene-butadiene) and poly(acrylonitrile-butadiene). Moreover, mixtures of two or more highly unsaturated rubbers may be employed.

The high and low molecular weight ethylene/propylene/nonconjugated polyene terpolymers, components (B) and (C), which may be employed are polymers of ethylene and propylene and at least one copolymerizable nonconjugated polyene. Illustrative of the nonconjugated polyenes which may be employed are aliphatic dienes such as 1,4-hexadiene, 1,5-hexadiene, 1,4-pentadiene, 2-methyl-1,4-pentadiene, 3-methyl-1,4-hexadiene, 4-methyl-1,4-hexadiene, 1,9-decadiene, exo- and endo-dicyclopentadiene and the like; exo- and endo alkenylnorbornenes, such as 5-propenyl-, 5-(buten-2-yl)-, and 5-(2-methylbuten-[2']-yl)norbornene and the like; alkylalkenylnorbornenes, such as 5-methyl-6-propenylnorbornene and the like; alkylidenenorbornenes, such as 5-methylene-, 5-ethylidene-, and 5-isopropylidene-2-norbornene, vinylnorbornene, cyclohexenylnorbornene and the like; alkylnorbornadienes, such as methyl-, ethyl-, and propylnorbornadiene and the like; and cyclodienes such as 1,5-cyclooctadiene, 1,4-cyclooctadiene and the like. The preferred nonconjugated polyenes are 5-ethylidene-2-norbornene, 1,4-hexadiene and dicyclopentadiene.

The ethylene content of the ethylene/propylene/nonconjugated polyene terpolymers that may be employed is generally between about 25% and about 85%, is preferably between about 30% and about 75%, and is most preferably between about 40% and about 70%, all by weight. The polyene content of such terpolymers is generally below about 25%, and is preferably between about 2 and about 20%, all by weight.

The high molecular weight EPDM polymers, Component (B) have a number average molecular weight of more than about 35,000, preferably of more than about 50,000, most preferably of more than about 60,000.

The low molecular weight EPDM polymers employed in the composition of this invention, Component C, are liquids at ambient temperatures, which are between about 20° and about 40° C. The term "liquid" is employed in conventional terms, that is that the polymer will have a definite volume, but will assume the shape of its container. More specifically, such low molecular weight polymers will be amenable to liquid handling techniques. Such liquid polymers will possess a number average molecular weight of from about 500 to about 15,000, with a preferred range of between about 2,000 and about 10,000, and a most preferred range of between about 4,000 and about 7,000.

The quinoline antidegradants employed in the practice of this invention are well known to those skilled in the art, and are frequently classified as being antiozonants and/or antioxidants. Among the preferred antidegradants are polymerized 2,2,4-trimethyl-1,2-dihydroquinoline (available from a number of sources, e.g., Naugard Q from Uniroyal Chemical Company, Inc.), 6-dodecyl-2,2,4-trimethyl-1,2-dihydroquinoline and 6-ethoxy-2,2,4-trimethyl-1,2-dihydroquinoline.

As is employed herein, the term "curative" encompasses both curatives and curing systems. As is well known to those skilled in the art, the particular curatives which may be employed in a given composition is generally governed by the availability of unsaturation and/or functional groups present in the polymers to be cured. A wide variety of curatives and curing systems may be employed where applicable, such as free radical generating agents such as organic aromatic and aliphatic peroxides, including, for example, aromatic diacyl peroxides and aliphatic diacyl peroxides, dibasic acid peroxides, ketone peroxides, alkyl peroxyesters and alkyl hydroperoxides. Specific nonlimiting examples of useful organic peroxides and hydroperoxides include diacetylperoxide, dibenzoylperoxides; bis-2,4-dichloro benzoyl peroxide; ditert.-butyl peroxide: dicumylperoxide: tert.-butylperbenzoate; tert.-butylcumyl peroxide; 2,5-bis-(tert.-butylperoxy)-2,5-dimethylhexane; 2,5-bis-(tert.-butylperoxy)-2,5-dimethylhexyne-3; 4,4,4',4'-tetra-(tert.-butylperoxy)-2,2-dicyclohexylpropane; 1,4-bis-(tert.-butylperoxyisopropyl)benzene; 1,1-bis-(tert.-butylperoxy)-3,3,5-trimethylcyclohexane; lauroyl peroxide; succinic acid peroxide, cyclohexanone peroxide; tert.-butyl peracetate and butyl hydroperoxide.

Also suitable in applicable cases are the azide curing agents including azidoformates, such as tetramethylenebis (azido-formate) and the like; aromatic polyazides, such as 4,4'-diphenylmethane diazide and the like; and sulfonazides such as p,p'-oxybis(benzene sulfonyl azide) and the like. Other curatives that may be used include the aldehydeamine reaction products such as formaldehyde-ammonia, formaldehyde-ethylchloride-ammonia, acetaldehyde-ammonia, formaldehyde-aniline, butyraldehyde-aniline, heptaldehyde-aniline, heptaldehyde-formaldehyde-aniline, hexamethylenetetramine, alpha-ethyl-beta-propylacrolein-aniline and the like; substituted ureas, such as trimethylthiourea, diethylthiourea, dibutylthiourea, tripentylthiourea, 1,3-bis (benzothiazolyl-mercaptomethyl)urea, N,N-diphenylthiourea and the like; guanidines, such as diphenylguanidine, di-o-tolylguanidine, diphenylguanidine phthalate, the di-o-tolylguanidine salt of dicatechol borate and the like; xanthates, such as zinc ethylxanthate, sodium isopropylxanthate, butylxanthic disulfide, potassium isopropylxanthate, and zinc butylxanthate and the like: dithiocarbamates, such as copper dimethyl-, zinc dimethyl-, tellurium diethyl-, cadmium dicyclohexyl-, lead dimethyl-, selenium dibutyl-, zinc pentamethylene-, zinc didecyl-, zinc isopropyloctyldithiocarbamate and the like; thiazoles, such as 2-mercaptobenzothiazole; zinc mercaptothiazolyl mercaptide, 2-benzothiazoly-N,N-diethylthiocarbamyl sulfide, 2,2'dithiobis(benzothiazole) and the like; imidazoles, such as 2-mercaptoimidazoline, 2-mercapto-4,4,6-trimethyldihydropyrimidine) and the like; sulfenamides such as N-t-butyl-2-benzothiazole-, N-cyclohexylbenzothiazole-, N,N-diisopropyl-benzothiazole-, N-(2,6-dimethylmorpholino)-2-benzo-thiazole-sulfenamide and the like; thiuramdisulfides, such as N,N'-diethyl-, tetrabutyl-, N,N'-diisopropyldioctyl-, tetramethyl-, N,N'-dicyclohexyl-, N,N'-tetralaurylthiuramidsulfide and the like; paraquinonedioxime, dibenzoparaquinonedioxime and the like; and sulfur itself. (See Encyclopedia of Chemical Technology, vol. 17, 2nd edition, Interscience Publishers, 1968; also Organic Peroxides, Daniel Swern, vol. 1, Wiley-Interscience, (1970).

When a peroxide curative is employed, such curative may be used alone or with auxiliary substances such as sulfur; maleimides, including bis-maleimides: polyunsaturated compounds, such as cyanurate and the like; acrylic esters, such as trimethylolpropane trimethacrylate and the like; organic transition metal salts, such as cobalt octoate, cobalt naphthenate, copper stearate, chromium laurate and the like; and tertiary amines, such as tributylamine, and dimethyloctylamine and the like.

When using sulfur as a curative (whether in its elemental form or in the form of a sulfur donor, e.g., 4,4-dithiomorpholine), it is desirable to include an accelerator and an activator (e.g., a metal salt or oxide).

Mixed peroxide-type or mixed sulfur-type curing systems may also be employed. These include dicumyl-peroxide plus 2,5-bis-(tert.-butylperoxy)-2,5-dimethylhexane or sulfur plus tetramethylthiuramidsulfide plus dicumyl peroxide. See "Vulcanization and Vulcanizing Agents," W. Hoffman, Palmerton Publishing Co., New York, 1967, for an extensive disclosure of curing agents.

Further, one particularly preferred curative is comprised of (i) at least one member of the group consisting of sulfur and sulfur donor compounds; (ii) at least one member of the group selected from organic peroxides and hydroperoxides; and (iii) a sulfur cure accelerator. Particularly preferred sulfur cure accelerators in such tri-component curatives are sulfenamides.

In addition to the high molecular weight elastomeric polymer, low molecular weight terpolymer, and curing agent described above, the blends of this invention may further comprise reinforcing agents, fillers, processing aids, extender oils, plasticizers, antioxidants, ultraviolet stabilizers, cross-linking agents and the like, all of which additional components are well known to those skilled in the rubber art.

The blend of this invention is typically prepared by first mixing all the ingredients except the curing agent in a suitable mixing device (such as a Banbury [trademark] type internal mixer, a two roll mill, or the like). Such mixing will typically require about 5 minutes, although shorter or longer mixing periods may be employed. This mixing may be performed at temperatures ranging from room temperature or cooler up to about 180° C. If mixing temperatures above the activation temperature of the curing agent are employed, upon completion of the mixing the blended rubber is cooled or allowed to cool to temperature below such activation temperature. The curing agent is then incorporated into the blend by subsequent mixing or milling.

Alternatively, the blend of this invention may be prepared by formulating a high molecular weight polymer component and a low molecular weight polymer component and blending desired amounts of the two components together. In this alternative embodiment, the location of the elements of the curing agent or of the curative is not critical, with any or all such elements or such curative being blended in either the high molecular weight component, the low molecular weight component, or both.

Vulcanization of the blend may be carried out in a press, an oven or other suitable means until crosslinking has occurred to a satisfactory state of cure.

The cured compositions of this invention exhibit unexpectedly desirable ozone resistance as well as admirable physical properties and are thus highly suitable for use in precision molded parts, e.g., footwear, brake parts, corner molds, wiper blades, rubber mounts, gas masks, tank treads, and nonstaining sponges.

EXAMPLES

The following Examples are intended to further illustrate the invention and are not intended to limit the scope of the invention in any manner.

EXAMPLES 1-4 AND COMPARATIVE EXPERIMENTS A AND B

Employing the ingredients indicated in Table I, (which are listed in parts per hundred by weight) several rubber compositions were produced as follows:

Natural rubber (Smr-CV5), high molecular weight EPDM (ethylene/propylene/5-ethylidene-2-norbornene (ENB); E/P weight ratio 57/43; 9.7 weight percent ENB; Mooney viscosity (ML 1+4 at 100° C.)=53, molecular weight approximately 70,000); low molecular weight liquid EPDM (ethylene/propylene/ENB, E/P weight ratio 54/46; iodine number=19; molecular weight=6,500), calcium carbonate, zinc oxide, stearic acid and quinoline antidegradant (1,2-dihydro-2,2,4-trimethylquinoline) in the amounts listed in Table I were charged to a Banbury type internal mixer. Mixing was continued until the temperature reached 154° C., then the mixing was stopped and the inside of the mixer was swept. Blending was then resumed for one more minute and the stock was removed from the mixer.

The curative ingredients (sulfur, mercaptobenzothiazole and diphenylquinoline) were incorporated in the cooled rubber stocks on a mill, with care being taken not to exceed 105° C. stock temperature.

TABLE I

COMPONENTS (PARTS BY WEIGHT)

| | EXAMPLE OR COMPARATIVE EXPERIMENT | | | | |
|---|---|---|---|---|---|
| | A | B | 1 | 2 | 3 |
| NATURAL RUBBER | 100 | 80 | 80 | 80 | 80 |
| HIGH MOLECULAR WEIGHT EPDM | — | 20 | 10 | 10 | 10 |
| LOW MOLECULAR WEIGHT EPDM | — | — | 10 | 10 | 10 |
| QUINOLINE ANTI-DEGRADANT | 5 | 5 | 5 | 5 | 5 |
| CALCIUM CARBONATE | 55 | 55 | 55 | 55 | 55 |
| STEARIC ACID | 1 | 1 | 1 | 1 | 1 |
| ZINC OXIDE | 5 | 5 | 5 | 5 | 5 |
| CURATIVE | | | | | |
| SULFUR | 3 | 3 | 3 | 3 | 3 |
| 2,2'-DITHIOBIS(BENZO-THIAZOLE) | 1 | 1 | 1 | 2 | 0.5 |
| DIPHENYLGUANADINE | 0.5 | 0.5 | 0.5 | 1.0 | 0.3 |

Samples of the materials of Examples 1–4 and Comparative Experiments A and B were cured for one hour at 149° C. (300° F.) and tested for their physical properties and ozone resistance. The results of such testings are summarized in Table II.

TABLE II

PHYSICAL DATA AND OZONE RESISTANCE

| | EXAMPLE OR COMPARATIVE EXPERIMENT | | | | |
|---|---|---|---|---|---|
| | A | B | 1 | 2 | 3 |
| SPECIFIC GRAVITY | 1.23 | 1.22 | 1.22 | 1.22 | 1.12 |
| DUROMETER SHORE "A" | 45 | 50 | 44 | 49 | 36 |
| TENSILE MPa | 20.39 | 14.65 | 14.58 | 11.32 | 8.08 |
| ELONGATION % | 547 | 563 | 597 | 507 | 603 |
| OZONE RESISTANCE* | | | | | |
| ASTM D-518 PROC.A. 50 pphm, 40° C. 20% ELONGATION | C less than 21 | VVS43 C71 | NC723 | C194 | NC723 |
| BENT LOOP (100 pphm, 40° C.) | C less than 18 | C less than 18 | VVS162 | VVS385 | NC772 |

*Data given in form of hours.
VVS = very very slight cracking
C = cracked
NC723 = No cracking after 723 hours
NC772 = No cracking after 772 hours.

The above results indicate the unexpectedly superior ozone resistance ehibited by the compositions of this invention. Especially noteworthy is a comparison of the ozone resistance exhibited by Comparative Experiment B and Example 1. While Comparative Experiment B, which employs the ozone resistance formulation described is U.S. Pat. No. 3,356,764 (comprising high molecular weight EPDM in combination with a quinoline antidegradant), does improve the ozone resistance of natural rubber somewhat, it is seen that the ozone resistance of Example 1 (wherein a portion of the high molecular weight EPDM has been replaced with low molecular weight, liquid EPDM) is unexpectedly greatly increased. Specifically, Comparative Experiment B cracked (in bent loop testing) in less than 18 hours whereas Example 1 only exhibited very slight cracking after 162 hours (a condition that did not noticeably worsen after 772 hours when testing was stopped).

What is claimed is:

1. An elastomeric composition formed by curing a blend comprised of
   (A) between about 70 and about 94 phr of a highly unsaturated rubber;
   (B) between about 3 and about 27 phr of an ethylene/propylene/nonconjugated diene terpolymer having a number average molecular weight of more than about 35,000;
   (C) between about 3 and about 27 phr of a liquid ethylene/propylene/nonconjugated diene terpolymer having a number average molecular weight of between about 500 and about 15,000;
   (D) between about 2 and about 7.5 phr of a quinoline antidegradant; and
   (E) an effective amount of curative.

2. A composition in accordance with claim 1 wherein between about 0.5 and about 5 phr of component (E) is present.

3. A composition in accordance with claim 1 wherein between about 80 and about 92 phr of component (A); between about 4 and about 20 phr of component (B); and between about 4 and about 20 phr of component (C) are present.

4. A composition in accordance with claim 3 wherein between about 83 and about 90 phr of component (A); between about 5 and about 10 phr of component (B); and between about 5 and about 10 phr of component (C) are present.

5. A composition in accordance with claim 1 wherein the molecular weight of component (C) is between about 2,000 and about 10,000.

6. A composition in accordance with claim 5 wherein the molecular weight of component (C) is between about 4,000 and about 7,000.

7. A composition in accordance with claim 1 wherein component (A) is selected from the group consisting of natural rubber, cis-polyisoprene, polybutadiene, poly(styrene-butadiene) and poly(acrylonitrile-butadiene).

8. A composition in accordance with claim 1 wherein component (D) is selected from the group consisting of polymerized 2,2,4-trimethyl-1,2-dihydro-quinoline, 6-dodecyl-2,2,4-trimethyl-1,2-dihydroquinoline and 6-ethoxy-2,2,4-trimethyl-1,2-dihydroquinoline.

9. A process for preparing an elastomeric composition, which process comprises the steps of: (I) forming a blend comprised of:
   (A) between about 70 and about 94 phr of a highly unsaturated rubber;
   (B) between about 3 and about 27 phr of an ethylene/propylene/nonconjugated diene terpolymer having a number average molecular weight of more than about 35,000;

(C) between about 3 and about 27 phr of a liquid ethylene/propylene/nonconjugated diene terpolymer having a number average molecular weight of between about 500 and about 15,000;

(D) between about 2 and about 7.5 phr of a quinoline antidegradant; and (E) an effective amount of curative; and (II) subjecting said blend to curing conditions for a time sufficient to cure and blend.

10. A process in accordance with claim 9 wherein between about 0.5 and about 5 phr of component (E) is present.

11. A process in accordance with claim 9 wherein between about 80 and about 92 phr of component (A); between about 4 and about 20 phr of component (B); and between about 4 and about 20 phr of component (C) are present.

12. A process in accordance with claim 11 wherein between about 83 and about 90 phr of component (A); between about 5 and about 10 phr of component (B); and between about 5 and about 10 phr of component (C) are present.

13. A process in accordance with claim 9 wherein the molecular weight of component (C) is between about 2,000 and about 10,000.

14. A process in accordance with claim 13 wherein the molecular weight of component (C) is between about 4,000 and about 7,000.

15. A process in accordance with claim 9 wherein component (A) is selected from the group consisting of natural rubber, cis-polyisoprene, polybutadiene, poly(styrene-butadiene) and poly(acrylonitrile-butadiene).

16. A process in accordance with claim 9 wherein component (D) is selected from the group consisting of polymerized 2,2,4-trimethyl-1,2-dihydro-quinoline, 6-dodecyl-2,2,4-trimethyl-1,2-dihydroquinoline and 6-ethoxy-2,2,4-trimethyl-1,2-dihydroquinoline.

* * * * *